United States Patent [19]
Ando et al.

[11] Patent Number: 4,656,081
[45] Date of Patent: Apr. 7, 1987

[54] SMOOTH NONWOVEN SHEET

[75] Inventors: Katsutoshi Ando; Nishiura Eiichi, both of Otsu, Japan

[73] Assignee: Toray Industries, Inc., Tokyo, Japan

[21] Appl. No.: 603,308

[22] Filed: Apr. 24, 1984

[30] Foreign Application Priority Data

Apr. 25, 1983 [JP] Japan ............................ 58-71451

[51] Int. Cl.$^4$ ............................................ B32B 5/02
[52] U.S. Cl. ................................ 428/233; 28/104;
428/236; 428/253; 428/284; 428/285; 428/286;
428/297; 428/298; 428/340; 428/904
[58] Field of Search ............ 428/102, 288, 296, 297,
428/298, 299, 171, 219, 246, 253, 284, 285, 904,
233, 236, 286, 340; 28/104

[56] References Cited

U.S. PATENT DOCUMENTS

| | | | |
|---|---|---|---|
| 4,107,374 | 8/1978 | Kusunose | 428/288 |
| 4,145,468 | 3/1979 | Mizoguchi et al. | 428/904 |
| 4,438,172 | 3/1984 | Katsutoshi et al. | 428/288 |
| 4,476,186 | 10/1984 | Kato et al. | 428/299 |
| 4,587,142 | 5/1986 | Higuchi et al. | 428/904 |

Primary Examiner—James J. Bell
Attorney, Agent, or Firm—Austin R. Miller

[57] ABSTRACT

A nonwoven sheet is provided having lengthwise and transverse directions, said sheet being composed mainly of fine fibers which are individually distributed substantially throughout the sheet and mainly oriented in the lengthwise direction. The sheet also includes yarn-like fiber bundles of fine fibers which are also oriented in the lengthwise direction of the sheet. The yarn-like fiber bundles outnumber the fine fibers on one surface of the sheet material and the fine fibers outnumber the yarn-like fiber bundles on the other surface of the sheet material.

It is made by a method in which a melted thermoplastic polymer is ejected from a spinneret with ejecting currents and thereafter it is impinged at a surface of a collecting member thereby forming a web characterized by the steps of arranging a melt blowing spinneret in such a way that the ejecting direction of the melted polymer and the current from the spinneret are inclined at an angle with respect to the tangential line of the surface of the collecting member thereby collecting said polymer into a web by producing a ejecting current which is forced to flow in one direction along the surface of the collecting member.

14 Claims, 15 Drawing Figures

SMOOTH NONWOVEN SHEET

TECHNICAL FIELD OF THE INVENTION

The present invention relates to a nonwoven sheet and method for making the same and particularly a melt blown nonwoven sheet having even and smooth surface, being useful for heat retaining and heat insulating.

TECHNICAL BACKGROUND

A method of making a nonwoven sheet by the melt blowing process has long been acknowledged publicly as disclosed in Japanese Patent Publication No. 22525, 1969, U.S. Pat. No. 3,825,380, for example.

In nonwoven sheet conventionally obtained by the melt blowing process, fibers are insufficiently separated from each other and there exist randomly many rope-like fiber bundles in which the fibers are entangled with each other, which fibers are formed into thick and coarse fiber bundles with resulting irregularity in weight of unit area of said sheet and unevenness in thickness. In addition, uniformity and smoothness of the surface of said sheet are spoiled by polymeric particles having no fibrous configuration, produced during the melt blowing process, and the rope-like fiber bundles having diameters from ten times to hundreds of times the diameter of the fibers constituting the sheet.

On the other hand, there are conventional methods in which merely a cumulative fiber mass is used as a padding for clothes or mats or bedclothes in order to give heat-retaining or heat insulating properties, or in which a synthetic polymeric film with aluminum vacuum evaporated onto it, is used in combination with the above-mentioned method. In the former method, retention of air is inevitably deteriorated to a large extent due to lowered compressive resilience of the fibers. In the latter method, the fibers used generally shrink during dry cleaning because of heat shrinkage of said fiber. Synthetic polymer films have a very coarse touch and when stitched with a needle machine, its tensile strength and tear strength are reduced to a large extent.

In order to eliminate the above-mentioned demerits, a method has been provided in which a nonwoven fabric consisting of filament fibers has a vacuum evaporated metal layer applied to one surface, and is layered with a web composed of short staple fibers on the surface of said metal layer by needle punching. (Japanese Utility Patent Publication No. 50-22150).

This method has a disadvantage, however, that since the unity of said web with said nonwoven fabric composed of filaments done by needle punching, a number of pores penetrating through the sheet in its thickness-wise direction are produced and heat tends to radiate through the pores so that sufficient heat retaining effect cannot be achieved.

OBJECT OF THE INVENTION

An object of the present invention is to provide a melt blow nonwoven sheet which has much better regularity and which is improved to a large extent in uniformity and smoothness of the sheet surface.

Another object of the present invention is to provide a nonwoven sheet composite structure which has high resistance to damage upon cleaning, as well as low permeability of vapor and high heat retention.

CONSTRUCTION OF THE INVENTION

The sheet according to the present invention has a construction having lengthwise and transverse directions, said sheet being composed mainly of fine fibers which are individually distributed substantially throughout the sheet and mainly oriented in the lengthwise direction; the sheet also includes yarn-like fiber bundles of fine fibers which are also oriented in the lengthwise direction of said sheet, further characterized in that the yarn-like fiber bundles outnumber the fine fibers on one surface of the sheet material and the fine fibers outnumber the yarn-like fiber bundles on the other surface of said sheet material.

In the method of making the nonwoven sheet of the invention a melted thermoplastic polymer is ejected from a spinneret under the influence of ejecting currents and is thereafter impinged at a surface of a collecting member forming a web. The melt blowing spinneret is arranged in such a way that the ejecting direction of the melted polymer and currents from said spinneret are inclined at an angle with respect to the tangential line of the surface of the collecting member thereby collecting said polymer into a web by producing a ejecting current which is forced to flow in a particular direction along the surface of the collecting member.

The nonwoven sheet according to the present invention is a sheet consisting mainly of fine fibers accumulated on each other composed of melt blow fibers which are oriented separately from each other and yarn-like fiber bundles which are oriented in the same direction as said fine fibers and in which fine fibers are entangled with each other. The fine fibers and the yarn-like fiber bundles coexist with each other all over the layers of the sheet, though the yarn-like fiber bundles outnumber the fine fibers on one surface of the sheet material and the fine fibers outnumber the yarn-like fiber bundles on the other surface of said sheet material.

The fine fiber is a fiber having a finite length consisting of melt-blown fibers and having a titre of not larger than 1 d. The yarn-like fiber bundle is a fiber bundle composed of plurality of melt blown fibers entangled each other having an average diameter of not larger than 1.5 mm and the number of the constituent fibers in said bundle is from several ends to several hundred ends. The yarn-like fiber bundle arranged separately from each other are oriented in the nonwoven sheet in the same direction as that of the fine fibers. This sharply differs from the thick rope-like fiber bundles (2 to 5 mm in diameter) which can be seen in conventional nonwoven sheets consisting of melt blown fibers arranged randomly and without orientation in the sheet.

The term "polymeric particles" refers to polymeric substances which are not blown into fine fibers during the melt blowing process and which have a configuration like a bristle lacking in fineness and having a thickness tens to hundreds of times the average fiber diameter of the constituent fibers of the sheet. The term "polymeric particles" also refers to tiny beads which may exist on an end surface or a middle portion of said sheet.

In the nonwoven sheet of the present invention, fine fibers and yarn-like fiber bundles are mixed with each other and oriented in one direction in regular order and hence the uniform nonwoven sheet has less unevenness and higher tensile strength than sheets of the prior art. In addition, on one (front) surface of the sheet the presence of yarn-like fiber bundles is much greater than the fine fibers and the bundles are arranged in such a way that any polymeric particles are buried behind them. Therefore, the smoothness of the surface of the sheet can be made extremely excellent. On the other hand, on the other (back) surface of the sheet, many more fine fibers are present than the yarn-like fiber bundles. While there is some effect of burying polymeric particles, such effect is somewhat poor compared with the opposite (front) side of the sheet.

The nonwoven sheet of the present invention has a sheet orientation of not less than 2, preferably not less than 3 and a coefficient of variation in sheet unevenness of not more than 12%, preferably not more than 9%.

The sheet orientation is determined from the ratio (A/B) in which (A) represents the sheet tensile strength in the direction of the orientation of the fine fibers and yarn-like fiber bundles and (B) represents the sheet tensile strength in the perpendicular direction to the former.

In the case of an nonwoven sheet which is not subjected to entangling treatment or adhesive treatment directions of orientation of the fine fibers and yarn-like fiber bundles arranged in said sheet can be observed clearly through stereoscopic observation at about 10×magnification. To further clarify the orientation degree, it can be achieved by sampling a piece of a square 50 (see FIG. 13) (length 2 cm×width 2 cm) of nonwoven sheet one pair of sides b, b' of which are approximately parallel to the direction of orientation in the nonwoven sheet, and by counting the number of fine fibers and yarn-like fiber bundles crossing another pair of sides a, a' which are arranged orthogonally to the direction of the orientation in said sheet at the same time.

The coefficient of variation of sheet unevenness is determined by the following equation after a sheet piece of 10 m² in size is sampled from an nonwoven sheet and divided into small pieces of length 10 cm×width 10 cm and each piece is weighed:

Coefficient of variation of sheet unevenness (%) =

$$\frac{\text{standard deviation}}{\text{mean value}} \times 100$$

Figure 1:
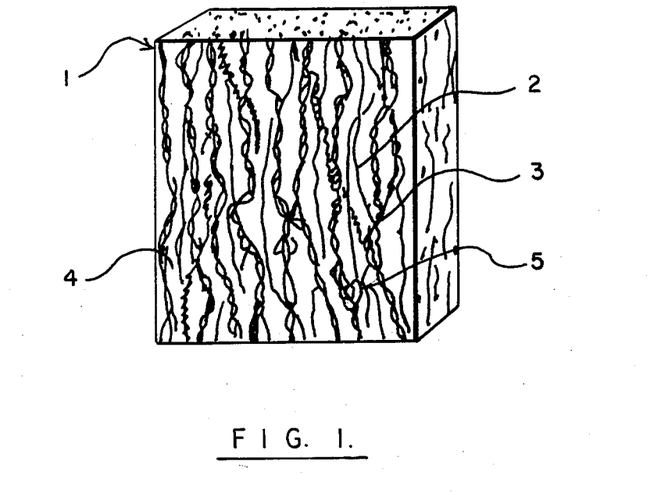
FIG. 1 is a schematic view showing the front surface of an nonwoven sheet of the present invention.

FIG. 1 is a view showing a nonwoven sheet 1 of the present invention observed from its front surface 4. It is observed in the figure that the sheet consists of fine fibers 2 of melt blown fibers separated from each other and highly oriented in one direction and yarn-like fiber bundles 3 formed by said melt blown fibers entangled with each other and highly oriented in the same direction as said fine fibers and that polymeric particles 5 are buried under these fine fibers 2 and yarn-like fiber bundles 3.

Figure 2:
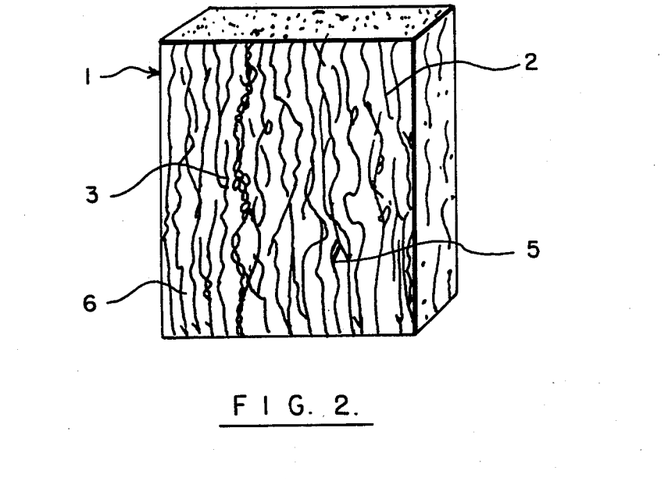
FIG. 2 is a schematic view showing the back surface of the same.

FIG. 2 is a view showing a nonwoven sheet of the present invention observed from its back surface 6. It is seen in the figure that the uniform nonwoven sheet consists of fine fibers 2 of melt blown fibers separated from each other and oriented in one direction and yarn-like fiber bundles 3 formed by said melt blow fibers entangled with each other and oriented in the same direction as said fine fibers and that polymeric particles are buried under these fine fibers 2 and yarn-like fiber bundles 3. In this case, however, the number of the yarn-like fiber bundles on the back surface is less than that of said bundles on the front surface and many polymeric particles 5 are exposed.

In the nonwoven sheet of the present invention, sheet formation is maintained by the fine fibers and the yarn-like fiber bundles being welded by self adhesion or entangled mutually among them or with each other. In order to further strengthen adhesion, the following treatments can be used: three-dimensional entangling treatment such as water punching; bonding treatment such as using resinous adhesion, stitch bonding and emboss-adhesion treatments; and multi layered construction of nonwoven sheets or nonwoven sheets and other sheet-form products such as fabric, knitting, net and nonwoven cloth.

The entangling treatment to be applied to the nonwoven sheet of the present invention is most preferably the water punching treatment, whereby a uniform nonwoven sheet can be obtained, in which fine fibers and yarn-like fiber bundles are highly oriented in the sheet direction and in which on one side of the sheet the yarn-like fiber bundles are more prevalent than the fine fibers, while on the other side the fine fibers are more prevalent than the yarn-like fiber bundles.

The nonwoven sheet subjected to a water punching treatment according to the present invention can achieve a tensile strength per unit weight of not less than 0.01 kg/5 cm/g/m².

Figure 3:
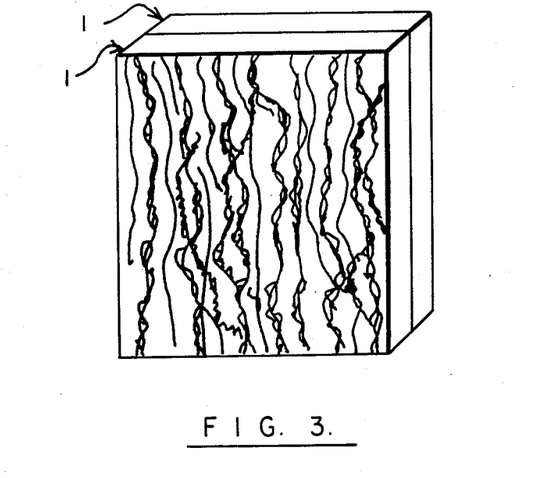
FIG. 3 is a schematic view showing an example of a sheet consisting of two nonwoven sheets of the present invention layered to each other.
Figure 4:
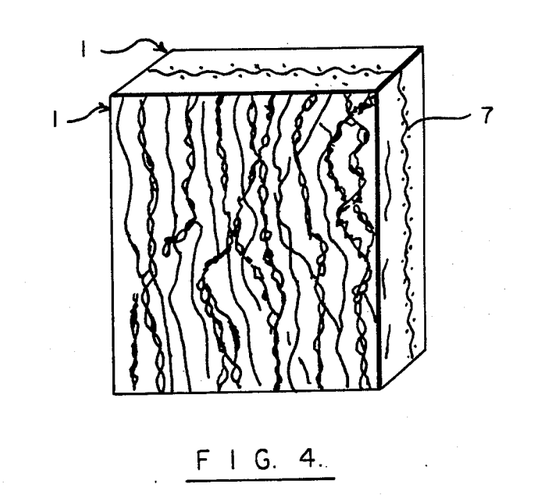
FIG. 4 is a schematic view showing a sheet consisting of an nonwoven sheet of the invention and another fabric layered to each other.

FIG. 3 shows an example of a layered sheet made up of nonwoven sheets of the present invention shown in FIG. 1. A uniform nonwoven sheet having both surfaces smooth can be obtained by a method in which two nonwoven sheets of this invention are layered in such a manner that the respective surfaces of said sheet on which the polymeric particles are much more in evidence are in contact with each other. It is possible to make a layer in such a way that the orientation of the fine fibers and the yarn-like fiber bundles in the respective nonwoven sheet are arranged orthogonally to each other.

Figure 5:
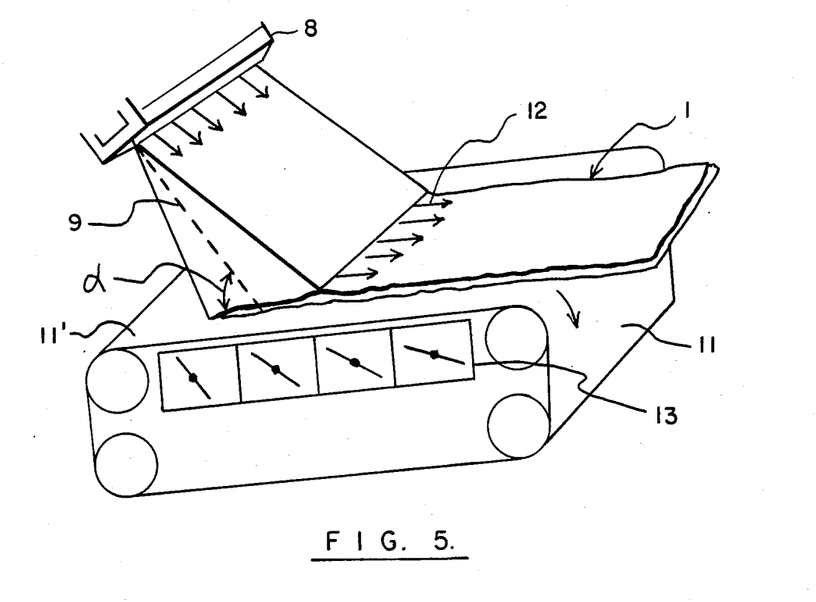
FIG. 5 is a schematic view showing one form of apparatus for performing the method of the invention.
Figure 6A:
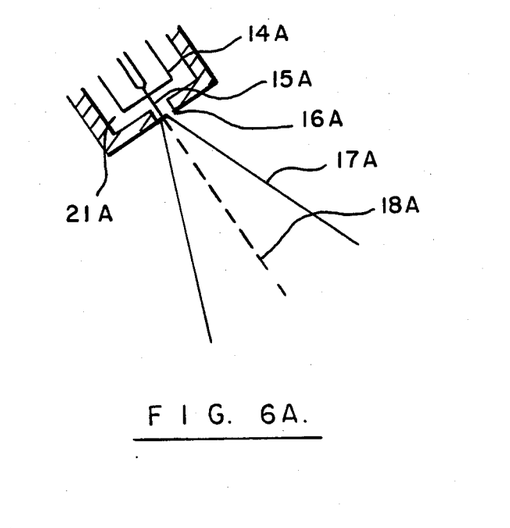
FIGS. 6A and 6B are cross sectional views showing examples of an ejecting spinneret used in the present invention.
Figure 6B:
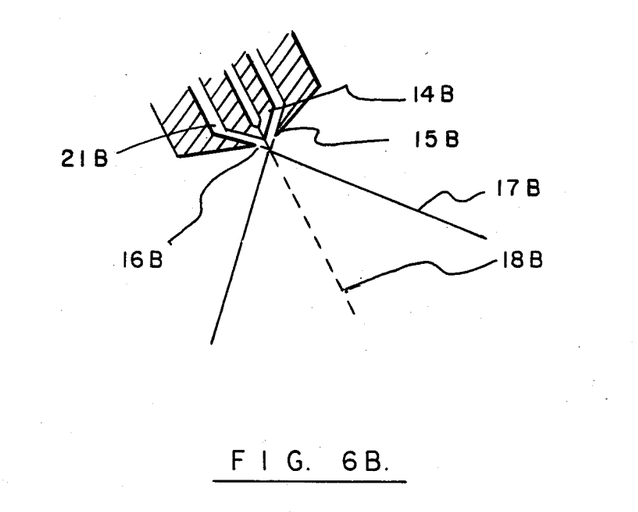

The method of making nonwoven sheet according to the present invention will now be described. FIG. 5 is a schematic view showing the method of the invention and FIGS. 6A and 6B are cross-sectional views showing an example of an ejecting spinneret, respectively. The number 11 represents a conveyor serving as a collecting member, 8 is an rectangular ejecting spinneret which is provided at a predetermined angle with respect to the collecting surface 11' of the conveyor, 14A and 14B are orifices, 21A and 21B are fluid slits or fluid paths, 16A and 16B are fine holes or slits formed immediately below the orifice, and 13 is a suction device serving to control the flow rate on the collecting surface.

To form the nonwoven sheet according to the present invention, it is important that an ejecting spinneret is provided at an angle $\alpha$ (hereinafter referred to simply as the ejecting angle $\alpha$) between axial line 9 of the melt blow jet current which is ejected from spinneret 8 and conveyor collecting surface 11'. It is important that the angle be between 15° and 75°, preferably between 30° and 60°, resulting in that a jet current is formed so as to flow in one direction, or in the direction of the arrows 12 along the collecting surface. Axial line 9 of the melt blow ejecting current refers to a central line 18A or 18B which is the central axis formed in the ejecting current expanding into air with an angle when melt polymer 15A, 15B discharged from orifice 14A, 14B by hot fluid 17A, 17B ejected from fine hole 16A or slit 16B, is made into fine fiber.

When the ejecting holes in the spinneret are arranged in multi-rows instead of in one row, the central axis of the rows is also taken as the central line.

Usually central line 9 forms a line perpendicular to the front surface of the ejecting spinneret.

An ejecting angle of not more than 15° is not preferable because it causes the cumulative web to scatter to a large extent under the influence of the ejecting current, with the result that satisfactory nonwoven sheet cannot be obtained. An ejection angle of not less than 75° is also not preferable because entangled melt blown fibers grow greatly to produce a number of thick rope-like fiber bundles and a disordered web is created, due to reflection currents caused by bombardment of melt blow ejection currents on the collecting surface, which results in sheet unevenness.

Ejecting currents flowing in one direction along the collecting surface makes it possible for producing separate fine fibers and formation of yarn-like fiber bundles by slight entangling of fine fibers simultaneously to each other and for arranging these fine fibers and yarn-like fiber bundles to coexist with each other with an orientation in the ejecting direction in good order on the collecting surface. The fine fibers and the yarn-like fiber bundles further serve to bury the polymeric particles at an inner portion in the sheet.

Figure 7:
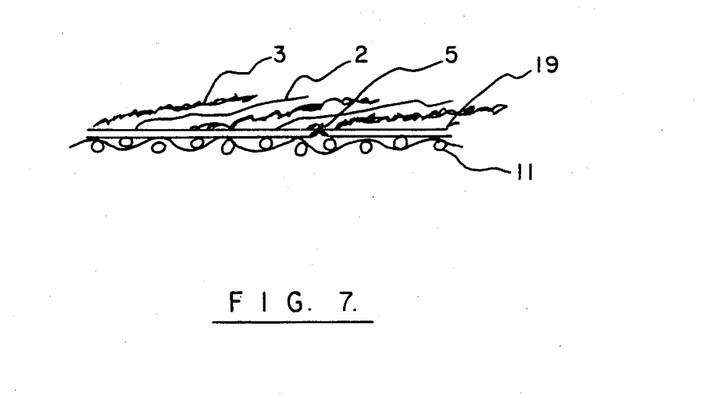
FIG. 7 is a view showing conditions of fine fibers and yarn-like fiber bundles on the surface of a collecting membier in this invention.

As shown in FIG. 7, excellent results are achieved because fine fibers 2 which are accumulated on the web surface are oriented while floating in the ejecting direction while separating from each other and at the same time fine fibers are entangled with each other to form yarn-like fiber bundles 3. These fine fibers and yarn-like fiber bundles which float over the surface 11' can cover and bury any polymeric particles 5 fixed on the web surface. On the bottom side of the web on the other hand, since friction with the conveyor is very great, yarn-like fiber bundles tend not to form and hence the ratio of fine fibers to bundles is higher tham at the upper surface of the sheet.

As a result, in this invention, the front (upper) surface of the sheet along which the ejecting current flows has yarn-like fiber bundles the number of which is much greater than that of the separated fine fibers, and the effect of burying polymeric particles is superior, while the back surface of the sheet facing upon the conveyer has separated fine fibers the number of which is much greater than that of the yarn-like fiber bundles and the effect of burying polymeric particles is somewhat poor because the occurrence of said yarn-like fiber bundles on said back surface of the sheet is less frequent than that on said front surface. In order to meet the above-described conditions, the flow velocity of the ejection current on the collecting surface is preferably not lower than 10 m/sec and more preferably not lower than 20 m/sec. Although its velocity on the collecting surface can be controlled by a suction gun provided below the surface, the suction gun may of course be omitted.

A conveyor having a horizontal surface made of wire mesh, flat board, etc. or a drum having a spherical surface may be used as the collecting surface.

The collecting surface may move in the same direction as the ejecting flow or in the opposite direction but the same direction is preferred.

Figure 8A:
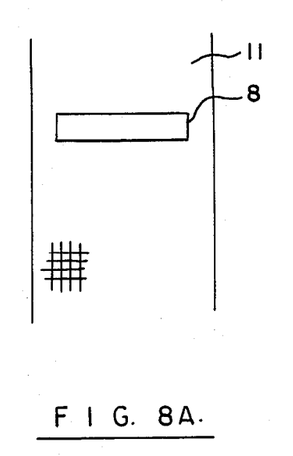
FIGS. 8A and 8B are a plan view showing a positional relation between an ejecting spinneret and the collecting surface.
Figure 8B:
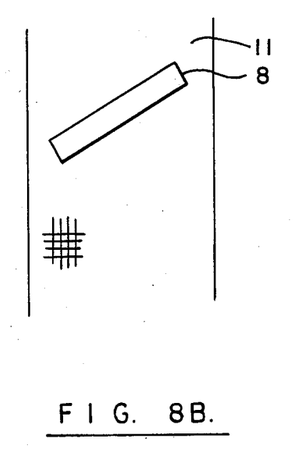

Referring to the positional relation of spinneret 8 with the collecting surface, it may be positioned perpendicularly to the direction of sheet travelling as shown in FIG. 8A or may be positioned obliquely as shown in FIG. 8B.

The collecting distance is 5 to 80 cm and preferably 10 to 50 cm. The collecting distance is the distance between the spinneret and the position at which the axial line of the ejection current intersects with the collecting surface.

When the collecting distance is not longer than 5 cm, the separation of fibers from each other and the orientation effect are poor since cooling of melted polymer is insufficient and when not less than 80 cm, no uniform sheet can be obtained and the orientation effect is insufficient, because fibers are stalled to produce random and irregular rope-like fiber bundles.

Ejection air volume is preferably not less than 3 Nl/min per unit polymer discharge of 1 g/min so as to bring about no rope-like fiber bundles due to fiber stalling before being collected and enhance uniformity and smoothness effects of sheet on the collecting surface.

Synthetic organic polymers used in the present invention include polymers capable of melt spinning such as polyolefin, polyester, polyamide, polyurethane, fluorine type polymer, ion type polymer, etc.

Figure 9:
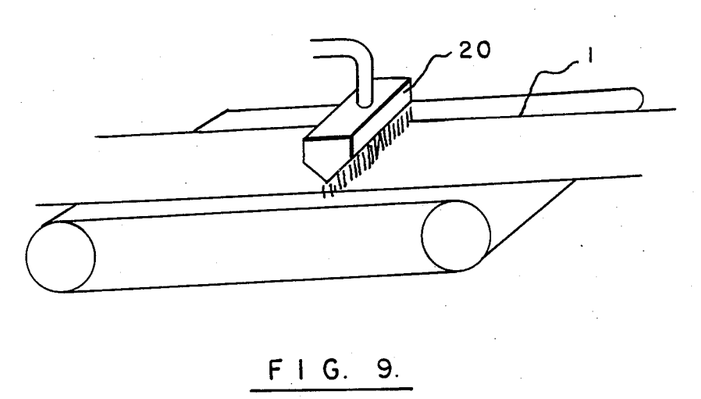
FIG. 9 is a schematic view showing an example of an nonwoven sheet of the invention being subjected to water punching.

The nonwoven sheet obtained by the present invention, which is able to be used as it is, can have various applications as basic materials through being subjected to entangling and bonding treatments such as water punching, resin adhesion, emboss adhesion, stitch adhesion, etc., according to uses and purposes. FIG. 9 shows an example of a entangling treatment using a water punching machine 20.

Nonwoven sheets obtained in this invention may be layered with each other adequately or this sheet may be layered with other nonwoven sheets, or other sheet material such as knitted fabric, woven fabric, and so on.

It is also possible in addition that synthetic leather can be produced by impregnating a layered sheet with an elastic resin and thereafter subjecting it to a buffing process or a coating process.

The nonwoven sheet of the present invention can be used as filters, heat insulating or retaining materials, various industrial basic materials, medical materials, synthetic leather materials, battery separators, etc., because of its uniformity, smoothness and high tensile strength.

The nonwoven sheet of said composite structure of the present invention, which has excellent resistance to cleaning, low vapor permeability and high heat retaining ability, will be described below.

A nonwoven sheet having a composite structure according to the present invention is a composite structure consisting of at least two layers of fiber sheets, at least one layer of which is a fine fiber sheet composed of melt blow fibers having a fineness of at least not more than 1 d and the other layer is a short staple web having a thin metal film on its one side.

A fine fiber sheet used in the present invention can exhibit excellent heat retaining ability and resistance to cleaning when fibers constituting the sheet have an average fineness of not more than 1 d. In order to make the sheet thin and fine and of high heat retaining ability, the average fineness should be not more than 0.5 d.

Short staple webs used for forming a metal thin film on one side in the present invention include any of the binder type nonwoven fabrics onto which a metal thin film layer of aluminum, etc, can be adhered by conventional means such as transcribing. In order especially to enhance the fastener effect with the fine fiber sheet and thereby lower the cleaning area shrinkage rate, the fluff degree is preferably between 50 and 500 counts per 10 cm on the average.

The fluff degree is determined as follows: a short staple web having a metal thin film layer adhered to one side is folded in such a way that short staple comes to the outside; the numbers of fluffs and loops raised in the range of 10 cm along the fold line are counted through a stereoscopic microscope as one fluff is counted as fluff degree 1 and one loop as fluff degree 2; and this operation is repeated five times to determine its mean value.

When a short staple web has a fluff degree of 50 to 500 counts, its fastener effect with a fine fiber nonwoven sheet is increased only by laying said web with a fine fiber sheet and the area shrinkage rate after cleaning is reduced thereby. In the case that a fluff degree is less than 50 counts, it causes fiber breaks in the fine fiber sheet and transference of air between fibers. When the fluff degree is more than 500 counts, the area shrinkage rate after cleaning becomes large and the cleaning resistance is weakened. Therefore both the foregoing cases are considered inferior.

The texture of short staple web is preferably 15 to 100 g/m$^2$ from a point of view of the drape effect and stability of the shape during cleaning.

For staples composed of a short staple web, it is recommendable to use staples having a fineness of about 0.8 to 5 d and a fiber length of about 20 to 100 mm in compliance with the denier, taking into consideration of drape effect, carding property and fastener effect with a fine fiber sheet.

A metal thin film layer of aluminum, etc. is adhered to the entire surface on one side of a short staple web using adhesives by the transcribing method for example.

Adhesives used in this case may be any ones capable of protecting the metal thin film layer and adhering it to the short staple web, including urethane resin, acrylic resin, unsaturated polyester resin, cellulose nitrate resin, etc., which are used in the so-called transcribing processing and which are used independently or in combination with each other.

The metal thin film layer formed on one side of a short staple web is of importance for radiating heat from the human body and preventing heat from escaping. The heat retaining effect can be enhanced greatly by combining a short staple web having the metal thin layer coated on one side with a fine fiber nonwoven sheet which consists of ultra-fine fibers and which has finely divided air cells therein is excellent in preventing convection.

In this sense, permeability of the metal thin film layer is important. When the nonwoven sheet having a composite structure of the present invention is used as a padding, the permeability is generally not more than 15 m/cm$^2$ . sec, preferably not more than 5 m/cm$^2$ . sec when measured by the Frazier method, depending on the materials used as surface fabrics in combination with this sheet.

When a short staple web having a metal thin film layer formed on one side is layered with a fine fiber sheet, the fine fiber sheet may be directly superposed on the surface of the short staple web not having the metal thin film layer. Alternatively, the fine fiber sheet may be superposed directly on the surface of said fine fiber sheet having the metal film layer with said metal film layer coming inside of the composite.

In the above description, a fine fiber sheet may be layered with a short staple web having a metal thin film layer on one side though, on the other surface of the fine fiber sheet, another short staple web can also be layered in order to further lower the cleaning area shrinkage rate of the composite structure with the metal thin film and improve handling.

Short staple webs layered on the other side of a fine fiber sheet include webs similar to the web used for laminating a metal thin film layer.

When a metal thin film layer of said short fiber web is directly superposed on a fine fiber sheet, since no substantial entangling effect is obtained, it is preferable to adopt the structure of kilting or to subject to a bonding process. When a fine fiber sheet is layered with a short staple web, any adequate adhesive may of course be used.

When the nonwoven sheet having the composite structure according to the present invention is used as a heat retaining material, the unit weight of fibers in the structure is preferably between 50 and 500 g/m$^2$. When used as clothing, it is preferably between 70 and 300 g/m$^2$ and the area shrinkage rate after cleaning is preferably not more than 10%.

The nonwoven sheet layered with a metal thin film layer according to the present invention will be described below with reference to FIGS. 10 to 12.

Figure 10:
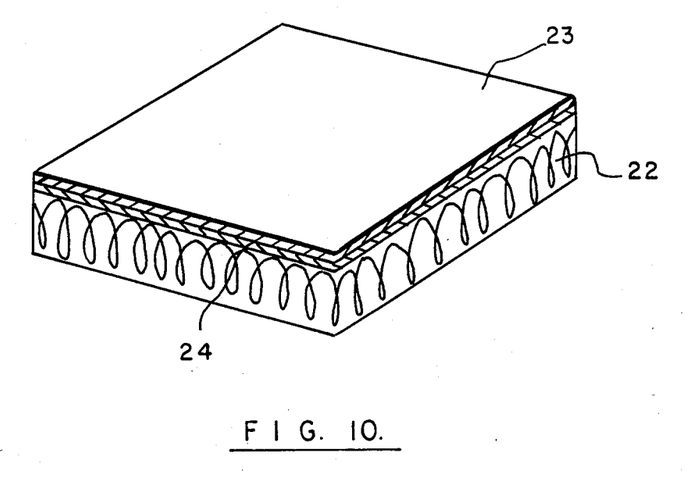
FIG. 10 is a schematic oblique view showing an example in which a nonwoven sheet is layered with a nonwoven fabric with a metal thin film thereon.
Figure 11:
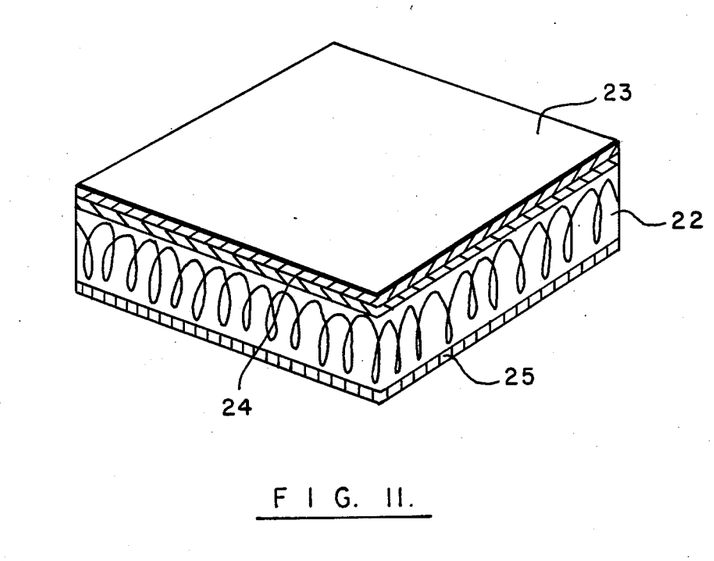
FIG. 11 is a schematic oblique view showing another example of FIG. 10.

FIG. 10 shows fine fiber sheet 22 layered with short staple web 24 on the surface of which a metal thin film layer 23 is formed and FIG. 11 shows an example in which other short staple web 25 is further layered on the other surface of fine fiber sheet 22. When using the aforementioned sheet as clothing, a surface cloth is further layered on a surface of the fine fiber sheet 22 (FIG. 10) or on that of the short staple web 25 side (FIG. 11). This may be made only by superposing but the resin bonding process is preferably applied in consideration of cleaning durability.

On the other hand, the lining fabric is layered on the opposite side. Of course the front surface fabric and the lining fabric may be used reversely.

Figures 12, 13:
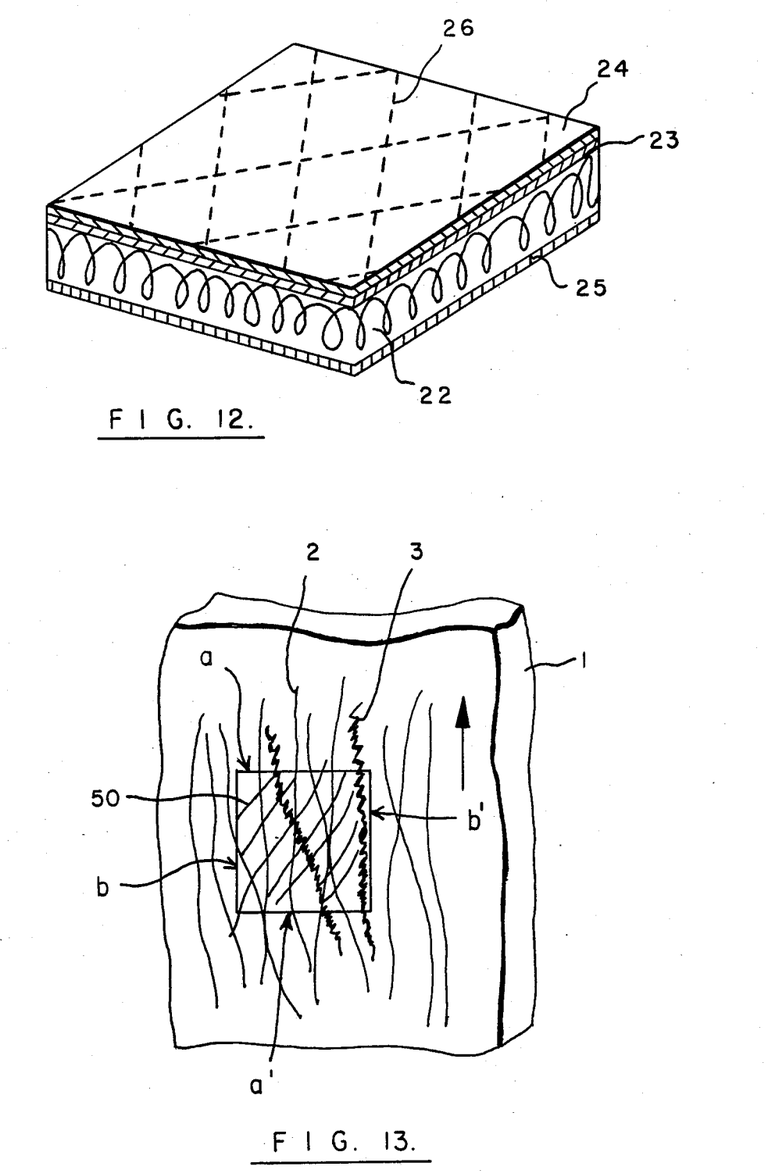
FIG. 12 is a schematic view showing a further example of FIG. 10.
FIG. 13 is a schematic view showing a square sample for checking the orientation of the sheet.

FIG. 12 shows fine fiber sheet 22 layered with a short staple web with metal thin film layer 23 inside with a kilting structure. When using as a cloth, the front surface fabric may be layered on the surface of a short staple web 24 side having the metal thin film layer and the lining fabric by layered on the opposite or vice versa.

Materials used as the short staple web of the present invention include simple substance or blends of polyester, polyamide, acrylonitrile, rayon, etc.

Because of its constitution as mentioned above, the nonwoven sheet composite structure according to the present invention has the following features:
(1) It is thin and yet has very high heat retaining ability.
(2) It has a unique soft touch and drape.
(3) It is crease free and has good stability of formation.
(4) It withstands petroleum type dry cleaning.
(5) It can be sewed with ease.

Therefore, the nonwoven sheet composite structure can be useful not only as a padding for cloth but also as sleeping bags, covers for foot warmers, gloves, boots, hats and various heat-retaining materials for industrial use. Since it is capable of combined use with other materials, it is a structure promising to have wide applications in the future.

The present invention will be described in detail with reference to the following examples.

Polymeric particles as described above are confirmed by pressure welding a nonwoven sheet by rolls, dyeing and thereafter counting the particles under a stereoscopic microscope. Heat resistance values, thicknesses and permeabilities are measured by the following methods: Heat resistance value: 1 clo means the heat retaining ability of a cloth to keep such a condition stable that the person examined can feel comfortable with the average skin temperature kept at 33° C., while lying quietly in a room with an atmospheric temperature of 21° C., a humidity of not more than 50% and an air current of 10 cm/sec.

It is assumed that the subject emits heat at a rate of 50 Kcal/m² hour and that 75% of the heat is radiated through his cloth.

1 clo is mathematically defined as follows: 1 clo=0.18° C. hour. m²/Kcal

The measurement is performed in accordance with ASTM: D-1518-57T.

Thickness: Thickness of the nonwoven sheet is measured using a sample of 2 cm² and 5 g/cm² of load.

Permeability is measured according to JIS-L-1096, the Frazier method.

EXAMPLE 1

In an apparatus as shown in FIG. 5, an ejection spinneret having a length of 125 cm was set so that the spinneret face was inclined with an ejection angle of 45° with respect to the collecting surface. Polybutylene terephthalate at 300° C. was discharged through 90 orifice holes having a diameter of 1 mm and arranged at 14 mm pitches and melt blowing was carried out using hot air at 340° C. through air holes the number of which was the same number as the orifices. A nonwoven sheet of the present invention was obtained after being collected on the conveyor surface moving at a velocity of 1 m/min.

In this case, the ejection angle was 45°, the collecting distance was 15 cm, the air velocity on the collecting surface was 105 m/sec and the ejecting air volume was 93 Nl/min (per 1 g/min of unit polymer discharge).

The nonwoven sheet thus obtained had a fineness of 0.09 d, an average diameter of yarn-like fiber bundles of 0.2 mm, the unit weight of the sheet was 150 g/m², the coefficient of variation in sheet unevenness was 4.9%, the orientation of the sheet was 5.1 and the heat resistance was 3.6 clo/cm. The sheet was a uniform nonwoven sheet in which fibers and yarn-like fiber bundles were highly oriented in the lengthwise direction of the sheet.

Referring to the correlation between the yarn-like fiber bundles and fine fibers, the former was dominant on the front surface of the nonwoven sheet (the surface not in contact with conveyor) and the latter was dominant on the back surface of the sheet (opposite side of the former).

Almost all polymeric particles were found buried under the front surface side. On the back surface, 12 pieces/cm² of polymeric particles were observed unburied.

In order to confirm to what extent the fine fibers and yarn-like fiber bundles were oriented in the obtained sheet, sheet orientation was checked by the method mentioned above. Fibers and yarn-like fiber bundles passing across at the same time the both sides b, b' in FIG. 13 parallel to the orientation direction were scarcely found. In other words, both sides a, a' in FIG. 13 orthogonal to the orientation direction of the sample were crossed almost by fine fibers and yarn-like fiber bundles.

EXAMPLE 2

In the apparatus as shown in FIG. 5, an ejection spinneret having a length of 125 cm was set in such a way that the spinneret face was inclined with an ejecting angle of 30° with respect to the collecting surface. Polypropylene heated to 320° C. was discharged through 90 orifice holes having a diameter of 1 mm and arranged at 14 mm pitch and melt blowing was performed using air heated to 350° C. through the same number of air holes as orifice holes. After the collection on the conveyor moving at a velocity of 1 m/min, water punching was carried out.

In this case, the ejecting angle was 30°, the collecting distance was 25 cm, the air velocity on the collecting surface was 82 m/sec and the ejection air volume was 60 Nl/min (per 1 g/min of unit polymer discharge).

The nonwoven sheet thus obtained according to the present invention had a fineness of 0.16 d, an average diameter of yarn-like fiber bundles of 0.23 mm, a texture of 150 g/m², a coefficient of variation of sheet unevenness of 5.8% and a sheet orientation of 4.6 and the sheet was a uniform nonwoven sheet in which fine fibers and yarn-like fiber bundles were highly oriented in the longitudinal direction of the sheet. As for the correlation between the yarn-like fiber bundles and the fine fibers, the former was present in larger amount on the front surface of the sheet, while the latter was present in larger amount on the back surface. 2 pieces/cm² of polymeric particles were found exposed on the front surface and the rest was buried, while 10 pieces/cm² of the polymeric particles were found exposed on the back surface.

This confirmation was made with relative ease since polymeric particles came up onto the surface due to water punching.

The front surface of the sheet felt smooth to the touch but the back surface felt uneven due to the presence of polymeric particles.

Water punching was carried out twice, one from the front surface of the sheet and another from the back surface. The conditions were hole diameter: 0.13 mm; hole pitch: 0.6 mm; vibration cycle of the spinneret: 5 cycle/sec; water pressure: 45 kg/cm$^2$; process velocity: 1 m/min.

EXAMPLE 3

As in Example 1, the ejection spinneret was set in such a way that an ejection angle became 60° and the sheet obtained after melt blowing was subjected to acrylic resin processing.

In this case, the ejection angle was 60°, the collecting distance was 30 cm, the air velocity on the collecting surface was 65 m/sec and the ejection air volume was 20 Nl/min (per 1 g/min of unit polymer discharge).

The nonwoven sheet thus obtained according to the present example had a fineness of 0.5 d, an average diameter of yarn-like fiber bundle of 0.3 mm, unit weight of the sheet of 100 g/m$^2$, a coefficient of variation in sheet unevenness of 5.3% and a sheet orientation of 3.2. The nonwoven sheet had fine fibers and yarn-like fiber bundles highly oriented in the longitudinal direction.

The front surface of the nonwoven sheet (surface not in contact with the conveyor) was enriched with yarn-like fiber bundles. One piece/cm$^2$ of polymeric particles was found on the front surface and 11 pieces/cm$^2$ were found on the back surface of it.

EXAMPLE 4

In the apparatus as shown in FIG. 5, an ejection spinneret having a length of 50 cm was set in such a way that the spinneret face was inclined at an ejection angle of 45° with respect to the collecting surface. Polybutylene terephthalate at 300° C. was discharged through 500 orifice holes having a diameter of 0.35 mm and arranged at 1 mm pitch each and melt blowing was carried out by ejecting hot air at 340° C. through slit holes. A nonwoven sheet of the invention was obtained after being collected on a conveyor moving at a velocity of 1 m/min.

In this case, the ejection angle was 45°, the collecting distance was 17 cm, the air velocity on the collecting surface was 110 m/sec and the ejection air volume was 170 Nl/min (per 1 g/min of unit polymer discharge).

The nonwoven sheet thus obtained according to the present invention had a fineness of 0.06 d, an average diameter of yarn-like fiber bundle of 0.17 mm, a unit weight of the sheet of 150 g/m$^2$, a coefficient of variation in sheet unevenness of 4.7% and a sheet orientation of 5.3 and the sheet was a uniform nonwoven sheet in which fine fibers and yarn-like fiber bundles were highly oriented in good order in the lengthwise direction of the sheet.

Yarn-like fiber bundles were richer on the front surface (surface not in contact with conveyor) of the present invention than on the back surface. When the sheet unevenness was measured, a sheet of 50 cm width and 200 cm long was sampled up and the measurement was made with a small piece of 10×10 cm. No polymeric particles were found on the front surface, while 6 pieces/m$^2$ of polymeric particles were found on the opposite surface.

Relating to the orientation of fine fibers and yarn-like fiber bundles, both of them were scarcely passing across at the same time, the both sides b,b' in FIG. 13 of the sample arranged parallel to the orientation direction.

EXAMPLE 5

The nonwoven sheets obtained in Example 1 were layered in such a way that the back surfaces of the sheets were in contact with each other. The layered sheet was then subjected to water punching. The sheet orientation was 4.8 and the coefficient of variation of sheet unevenness was 4.5%

Both exposed surfaces of the sheet were enriched with yarn-like fiber bundles and had a smooth surface on which almost no polymeric particles were found exposed. The water punching was carried out in accordance with Example 2, except that a water pressure of 70 kg/cm$^2$ was used.

EXAMPLE 6

A coarse leno fabric was interposed between the nonwoven sheets obtained in Example 5 and the product was subjected to water punching. The resulting sheet was a uniform nonwoven sheet and had a coefficient of variation of sheet unevenness of 4.4%.

Polymeric particles on the sheet surface were buried under fine fibers and yarn-like fiber bundles. The sheet had a smooth surface having almost no polymeric particles exposed thereon.

The leno fabric used had a warp of 20 d–2f, a weft of 20 d 2f, a warp density of 20 ends and a weft density of 20 ends. The water punching conditions were in accordance with those in Example 5.

EXAMPLE 7

In the apparatus as shown in Example 1, a small-size ejection spinneret having a length of 25 cm was used to conduct the following tests.

Melt blowing was carried out under the same condition as Example 1, except the use of a ejection angle of 13° and a collecting distance of 20 cm. As a result, cumulative fibers were scattered or torn to pieces and hence no cumulative web was obtained.

A sheet obtained after the melt blowing conducted at an ejection angle of 80° and a collecting distance of 15 cm had a unit weight of the sheet of 80 g/m$^2$ and a coefficient of variation in sheet unevenness of 13%. Fine fibers and yarn-like fiber bundles were found not oriented and no polymeric particles were found buried. The number of polymeric particles on the front surface was 12 pieces/cm$^2$ and the same number was found on the back surface.

EXAMPLE 8

Melt blowing was carried out at a collecting distance of 4 cm using the apparatus in Example 7. Fibers were welded with each other, resulting in no orientation and no effect of burying polymeric particles. Furthermore, melt blowing was carried out at a collecting distance of 100 cm. However, with random rope-like fiber bundles generated, the obtained sheet was a nonuniform sheet having a unit weight of 100 g/m$^2$ and a coefficient of variation of sheet unevenness of 14%. The rope-like fiber bundle had a diameter of 3 mm.

EXAMPLE 9

A tensile strength in unit weight of the nonwoven sheet obtained in Example 2 was compared with a tensile strength in unit weight of a comparative nonwoven sheet which was collected for comparison in the same manner as in Example 2, except for the ejecting angle of 90°, namely vertical to the conveyor surface.

The nonwoven sheet of Example 2 of the present invention had a longitudinal tensile strength of 0.052 kg/5 cm/g/m$^2$ and a lateral tensile strength of 0.035 kg/5 cm/g/m$^2$, while the comparative nonwoven sheet had a longitudinal tensile strength of 0.005 kg/5 cm/g/m$^2$ and a lateral tensile strength of 0.002 kg/5 cm/g/m$^2$.

The nonwoven sheet of the present invention has longitudinally high tensile strength in unit weight in particular.

The reason for this is considered to be that fine fibers and yarn-like fiber bundles are oriented in the lengthwise direction of the sheet and that stresses are effectively shared by them. By contrast, in the comparative nonwoven sheet, fine fibers and rope-like fiber bundles are oriented randomly and less extended and hence stresses are not effectively shared by them. This is the reason why the sheet can be easily broken in structure and has poor tensile fracture strength.

EXAMPLE 10

The nonwoven sheet obtained in Example 1 was subjected to water punching under the same condition as Example 2. The tensile strength per unit weight of the obtained nonwoven sheet was 0.052 kg/5 cm/g/m$^2$ longitudinally and 0.035 kg/5 cm/g/m$^2$ laterally.

For comparison, the tensile strength of a comparative sheet, which was collected in the same manner as in Example 1 excepting the ejection angle of 90°, or vertical to the conveyor surface, was measured. As a result, it has a longitudinal value of 0.005 kg/5 cm/g/m$^2$ and a lateral value of 0.002 kg/5 cm/g/m$^2$. The sheet had a heat resistance of 2.5 clo/cm.

The above-mentioned comparative nonwoven sheet was subjected to water punching under the same condition as Example 2. As a result, fiber breaks occurred and no entangling effect was obtained.

The reason for this is considered to be that the ejection pressure caused by the vertical ejection resulted in welding of fibers with each other to a large extent leading to no movement of fibers and hence fiber breaks were caused.

As another comparative example, a comparative nonwoven sheet was prepared to prevent fibers from welding with each other by changing the ejection angle and the collecting distance in Example 1 to 90° and 120 cm, respectively, and subjected to water punching under the same condition as mentioned above. The tensile strength per texture of the nonwoven sheet thus obtained was 0.008 kg/5 cm/g/m$^2$ longitudinally and 0.005 kg/5 cm/g/m$^2$ laterally. The reason for the low tensile strength of the comparative sheet is considered to be that no entangling effect was achieved, because of its sheet unevenness as large as 18%.

EXAMPLE 11

Polybutylene terephthalate was melt blown to prepare a padding consisting of a fine fiber sheet having an average fineness of 0.3 d and a unit weight of 120 g/m$^2$. On the other hand, metallic aluminum was vacuum evaporated on a polypropylene film to a thickness of 400 Å and the aluminum film was transferred to one side of a short staple web having a unit weight of 19 g/m$^2$ and a ratio of staple to binder of 55 to 45. Mixed staple fibers consisting of polyester staple of 1.5 d, nylon 6 staple of 1.5 d and rayon staple of 1.8 d in the ratio of 70/20/10 were used in this example and acrylic binder was used as the binder.

The same short staple web as the above-mentioned short staple web was prepared without metallic film and the padding was sandwiched by the staple webs being metallic film and the staple webs without metal film to prepare a metal thin film composite structure. The structure had a unit weight of 160 g/m$^2$, a thickness of 2.6 mm, a heat resistance of 6 clo/cm and a permeability of 1.0 cc/cm$^2$.sec.

A winter coat was prepared by sewing up with the obtained metal thin film layer-laminated nonwoven sheet using a oil coated fabric consisting of polyester and cotton having a unit weight of 150 g/m$^2$ as a front surface fabric and a nylon taffeta having unit weight of 70 g/m$^2$ as back surface fabric. The composite product thus obtained had a heat resistance of 7 clo/cm, showed excellent heat retaining ability and felt soft and fitting and hence an extremely superior winter cloth. Even after using it for a long time and subjecting it to 5 times repetition of petroleum type dry cleaning, the product showed little degradation in heat retaining ability, had no shrinkage and thus proved having very high durability.

EXAMPLE 12

The same fine fiber sheet as Example 11, a short staple web having a metal film layer on one side of it and a short staple web were layered with each other as shown in FIG. 12 and subjected to kilting processing at a pitch of 4 mm so as to have a space of 225 cm$^2$ to prepare a metal thin film layer-laminated nonwoven sheet of the present invention. The structure thus obtained had unit weight of 162 g/m$^2$, a thickness of 2.5 mm, a heat resistance of 6.2 clo/cm and a permeability of 2.5 cc/cm$^2$.sec.

A winter coat was prepared by further laying a front surface fabric and a back surface fabric on respective surface of said sheet and sewing up them in the same manner as in Example 11. The obtained composite product had a heat resistance of 7.2 clo/cm, excellent heat retaining ability and high durability in practical use.

EXAMPLE 13

Polybutylene terephthalate was melt blown to prepare a padding consisting of a fine fiber nonwoven sheet having an average fineness of 0.2 denier and unit weight of 200 g/m$^2$. One side of the padding was layered with a short staple web having a metal thin film layer on one surface of it as used in Example 11 and thereafter a "Tetron" spun fabric (unit weight 170 g/m$^2$) was layered on the other surface of it by using acryl-vinyl chloride copolymer resin (5 g/m$^2$). A winter coat was prepared through sewing with "Tetron" taffeta (unit weight 80 g/m$^2$) used as the back surface fabric layered on the opposite surface of it on which "Tetron" spun fabric was already layered.

The composite product thus obtained had unit weight of 480 g/m$^2$, a thickness of 6 mm, a heat resistance of 4.5 clo/cm and a permeability of 0.2 cc/cm$^2$.sec. As a result, the product felt comfortable to wearing, especially was excellent in fitting property, showed no change in appearance even after wearing over a long day period and exhibited high heat retaining ability. It also showed high durability even when petroleum type dry cleaning was repeated.

We claim:

1. A smooth nonwoven sheet having lengthwise and transverse directions, said sheet being composed mainly of fine fibers which are individually distributed substantially throughout the sheet and mainly oriented in the lengthwise direction; and said sheet also including yarn-like fiber bundles of entanglements of said fine fibers which are oriented also in the lengthwise direction of said sheet, further characterized in that the ratio of fiber bundles to fibers on one surface of the sheet is greater than the ratio of fiber bundles to fibers on the other surface of the sheet.

2. A nonwoven sheet as claimed in claim 1, wherein the fine fibers are thermoplastic synthetic fibers and are produced by a melt blowing process.

3. A nonwoven sheet as claimed in claim 1, wherein the fine fiber is a fiber having a finite length and a denier of not more than 1 denier.

4. A nonwoven sheet as claimed in claim 1, wherein the coefficient of variation of sheet unevenness is not more than 12%.

5. A nonwoven sheet as claimed in claim 1, wherein the fine fiber is polybutylene terephthalate.

6. A nonwoven sheet as claimed in claim 1, wherein said nonwoven sheet is subjected to water punching treatment.

7. A nonwoven sheet as claimed in claim 1, wherein the tensile strength per unit weight of the sheet is not less than 0.01 kg/5 cm/g/m$^2$.

8. A nonwoven sheet as claimed in claim 1, wherein a sheet selected from the fine fiber sheet material and another sheet material is layered on at least one surface of said fine fiber sheet material.

9. A nonwoven sheet as claimed in claim 8, wherein the other sheet material to be layered on said fine fiber sheet material is also a nonwoven sheet.

10. A nonwoven sheet as claimed in claim 8, wherein the other sheet to be layered is a fabric selected from a knitted fabric and a woven fabric.

11. A nonwoven sheet as claimed in claim 9, wherein the other nonwoven sheet to be layered consists of short staple fibers having a film like thin metal layer provided on one surface of said fabric sheet.

12. A nonwoven sheet as claimed in claim 11, wherein the fine fiber sheet material is layered on the surface of said nonwoven fabric sheet provided with a film like thin metal layer thereon.

13. A nonwoven sheet as claimed in claim 11, wherein the other nonwoven fabric sheet having short staple fibers is layered on the other surface of the fine fiber sheet material opposite the surface of said sheet material provided with a nonwoven fabric sheet with a metal thin layer thereon.

14. A nonwoven sheet as claimed in claim 11, wherein the nonwoven fabric sheet consisting of short staple fibers having a film like thin metal layer on one surface has an average fluff frequency of 50 to 500 counts per 10 cm.

* * * * *